(12) United States Patent
Jeon

(10) Patent No.: US 11,802,343 B2
(45) Date of Patent: Oct. 31, 2023

(54) OXYGENATED WATER MANUFACTURING DEVICE

(71) Applicant: FOURL DESIGN CO., LTD., Gyeonggi-do (KR)

(72) Inventor: Suk Ho Jeon, Gyeonggi-do (KR)

(73) Assignee: FOURL DESIGN CO., LTD., Gyeonggi-do (KR)

( * ) Notice: Subject to any disclaimer, the term of this patent is extended or adjusted under 35 U.S.C. 154(b) by 623 days.

(21) Appl. No.: 16/636,729

(22) PCT Filed: Jul. 24, 2018

(86) PCT No.: PCT/KR2018/008370
§ 371 (c)(1),
(2) Date: Feb. 5, 2020

(87) PCT Pub. No.: WO2019/031733
PCT Pub. Date: Feb. 14, 2019

(65) Prior Publication Data
US 2020/0240022 A1    Jul. 30, 2020

(30) Foreign Application Priority Data
Aug. 11, 2017   (KR) .................. 10-2017-0102640

(51) Int. Cl.
*C25B 9/00*   (2021.01)
*C25B 15/00*  (2006.01)
(Continued)

(52) U.S. Cl.
CPC .................. *C25B 1/04* (2013.01); *A23L 2/54* (2013.01); *B01D 53/025* (2013.01);
(Continued)

(58) Field of Classification Search
CPC ........... C25B 15/08; C25B 1/04; C25B 15/02; C25B 1/00; C25B 9/00; C25B 9/17;
(Continued)

(56) References Cited

U.S. PATENT DOCUMENTS 5,401,371 A      3/1995  Oshima et al.
2003/0024828 A1  2/2003  Kondo et al.
(Continued)

FOREIGN PATENT DOCUMENTS

CN       1172770 A    2/1998
CN     101519254 A    9/2009
(Continued)

OTHER PUBLICATIONS

Huang Wei et al., "Good water drinks healthy electrolyzed reduced water", Jan. 2014, pp. 87-91, South China University of Technology Press.
(Continued)

*Primary Examiner* — Zulmariam Mendez
(74) *Attorney, Agent, or Firm* — IP Legal Services, LLC

(57) ABSTRACT

The present invention relates to an oxygenated water manufacturing device, which can be used in various fields because it can be applied to and used for not only mineral water or purified water, but also other various drinks such as tap water, barley tea, green tea, corn silk tea, and soju by using a specific configuration, which allows use of only high-purity oxygen from which ozone, which is produced with oxygen when mineral water is electrolyzed, and various inorganic substances and organic substances such as calcium (Ca), magnesium (Mg), and silicon (Si) contained in the mineral water are completely filtered out, and which completely prevents a phenomenon in which oxygen is not generated by deformation of an ion resin membrane disposed between an anode (+) and a cathode (−) in the oxygen
(Continued)

generator due to a water-drying phenomenon in the hydrogen outlet.

5 Claims, 8 Drawing Sheets

(51) Int. Cl.
*C25B 1/04* (2021.01)
*A23L 2/54* (2006.01)
*B01D 53/02* (2006.01)
*B01D 53/04* (2006.01)
*C02F 1/461* (2023.01)
*C02F 1/68* (2023.01)
*C25B 15/08* (2006.01)
*C25B 9/73* (2021.01)
*C25B 9/23* (2021.01)
*C02F 103/02* (2006.01)

(52) U.S. Cl.
CPC ...... *B01D 53/0446* (2013.01); *C02F 1/46104* (2013.01); *C02F 1/68* (2013.01); *C25B 9/23* (2021.01); *C25B 9/73* (2021.01); *C25B 15/08* (2013.01); *A23V 2002/00* (2013.01); *B01D 2253/102* (2013.01); *B01D 2256/12* (2013.01); *B01D 2257/106* (2013.01); *C02F 2103/02* (2013.01)

(58) Field of Classification Search
CPC ....... C25B 15/00; C25B 1/02; C02F 1/46104; C02F 2201/4611; C02F 2201/4618; C02F 2209/06; C02F 1/001; C02F 1/4618; C02F 2201/46145; C02F 2303/04; C02F 1/444
See application file for complete search history.

(56) References Cited

U.S. PATENT DOCUMENTS

| | | | | |
|---|---|---|---|---|
| 2008/0283392 | A1* | 11/2008 | Karabin | C25B 1/04 204/253 |
| 2011/0064824 | A1 | 3/2011 | Lascoste et al. | |
| 2015/0197863 | A1 | 7/2015 | Kim et al. | |
| 2017/0036927 | A1 | 2/2017 | Chung | |
| 2019/0024249 | A1 | 1/2019 | Jeon | |
| 2019/0360109 | A1 | 11/2019 | Jeon | |

FOREIGN PATENT DOCUMENTS

| | | |
|---|---|---|
| CN | 101519255 A | 9/2009 |
| CN | 201473336 U | 5/2010 |
| CN | 101746855 A | 6/2010 |
| CN | 201530737 U | 7/2010 |
| CN | 101910069 A | 12/2010 |
| CN | 201695092 U | 1/2011 |
| CN | 203263065 U | 11/2013 |
| CN | 105433796 A | 3/2016 |
| CN | 105543883 A | 5/2016 |
| CN | 205275285 U | 6/2016 |
| CN | 106830215 A | 6/2017 |
| JP | 2002-282871 A | 10/2002 |
| JP | 2005-111356 A | 4/2005 |
| JP | 2011-092886 A | 5/2011 |
| JP | 2015-131295 A | 7/2015 |
| JP | 3201284 U | 12/2015 |
| JP | 3209751 U | 4/2017 |
| JP | 2018-529838 A | 10/2018 |
| JP | 2019-529106 A | 10/2019 |
| KR | 10-0146185 B1 | 7/1998 |
| KR | 10-2004-0097046 A | 11/2004 |
| KR | 10-2004-0103291 A | 12/2004 |
| KR | 10-2006-0045714 A | 5/2006 |
| KR | 10-2009-0059214 A | 6/2009 |
| KR | 10-2010-0004219 A | 1/2010 |
| KR | 10-2014-0067306 A | 6/2014 |
| KR | 10-1575164 B1 | 12/2015 |
| KR | 10-2016-0006655 A | 1/2016 |
| KR | 10-2016-0033467 A | 3/2016 |
| KR | 10-2016-0041550 A | 4/2016 |
| KR | 10-1609875 B1 | 4/2016 |
| KR | 10-1742948 B1 | 6/2017 |
| WO | 2017/018809 A1 | 2/2017 |

OTHER PUBLICATIONS

The State Intellectual Property Office of People's Republic of China, Office Action of corresponding CN Patent Application No. 201880051013.8, dated Dec. 24, 2021.
The State Intellectual Property Office of People's Republic of China, Office Action of CN Patent Application No. 201780054979.2, dated Dec. 3, 2021.

* cited by examiner

OXYGENATED WATER MANUFACTURING DEVICE

CROSS REFERENCE TO RELATED APPLICATIONS

This application is a National Stage Patent Application of PCT International Patent Application No. PCT/KR2018/008370 (filed on Jul. 24, 2018) under 35 U.S.C. § 371, which claims priority to Korean Patent Application No. 10-2017-0102640 (filed on Aug. 11, 2017), the teachings of which are incorporated herein in their entireties by reference.

TECHNICAL FIELD

The present invention relates to an oxygenated water manufacturing device and, more particularly, to an oxygenated water manufacturing device that produces oxygenated water by supplying oxygen, which is generated by an oxygen generator that generates oxygen by electrolyzing water, to water using a fluid pump that suctions or discharges the oxygen.

The oxygenated water manufacturing device can be used in various fields because it can be applied to and used without difficulties for not only mineral water or purified water, but also other various drinks such as tap water, barley tea, green tea, corn silk tea, and soju by using a specific configuration.

Further, the oxygenated water manufacturing device provides only high-purity oxygen by primarily filtering out ozone, which is generated with oxygen when the oxygen is generated, and inorganic substances or organic substances containing calcium (Ca), magnesium (Mg), and silicon (Si) contained in mineral water in a wet type using a wet-type ozone removal filter made of carbon, by discharging the oxygen to an oxygen outlet, and then by secondarily completely filtering out ozone in a dry type using a dry-type ozone removable filter made of carbon and connected to the oxygen outlet.

Further, the oxygenated water manufacturing device completely prevents a phenomenon in which oxygen is not generated by deformation of an ion resin membrane disposed between an anode and a cathode in an oxygen generator due to a water-drying phenomenon at a hydrogen outlet by keeping water collected in the hydrogen outlet by connecting the hydrogen outlet connected to the bottom of the oxygen generator to a sponge case having sponge therein and disposed at the upper portion of a side of the oxygen generator.

BACKGROUND ART

Oxygen is suctioned into a human body through respiration, is supplied to organs of the body by blood, and is used for brain activity and kinetic energy.

There are great differences in oxygen consumption in an organism, depending on tissues. Further, comparing the oxygen consumption by the brain and muscles, the oxygen consumption by a brain is larger.

The brain that is an organ that consumes the largest amount of oxygen compared to the intestines and other organs and weighs not more than 1.4 kg, which is about 2% of the entire weight of human, but the oxygen consumption by the brain is about 25% of the entire body.

The brain does not have a substance such as 'myoglobin' that can somewhat keep oxygen in the body like muscles, so the brain fully consumes oxygen at once.

When air that is inhaled enters a non-oxygen state, necessary oxygen tension is not generated due to waste blood, so even one breath of the anoxic air may cause loss of consciousness.

Oxygen oxygenates a human body and provides an ability that resists infectious microorganisms and pathogenic bacteria. Organisms cannot live unless oxygen keeps being supplied even to cells at remote places in the body. Such flow is generated by the heart and lungs, the lung has about 700 million lung cells (alveoli) at the left and right sides and supplies oxygen to the blood, and the oxygen is supplied even to remote parts of the body by pumping of the heart.

The blood of most modern people is oxidized due to a deficit of exercise and harmful food and cholesterol sticks to the inside of blood vessels, which is the root of all the adult diseases. However, it is possible to restore the weakened functions by supplying fresh oxygen.

There is an 'oxygenated water manufacturing device' in Korean Patent Application No. 10-2003-0034755 as an example of oxygenated water manufacturing devices that produces water containing a large amount of oxygen.

Such an oxygenated water manufacturing device produces oxygenated water by generating oxygen using an oxygen generator, which uses three types of a PSA type, a membrane type, and a flat film type, and rapidly dissolving the oxygen into water.

However, according to such an oxygenated water manufacturing device of the related art, the process of generating oxygen is complicated, and the purity of oxygen greatly drops when the oxygen is generated because humidity, which is generated when a fluid pump suctions, compresses, and sends air to a nozzle, acts on zeolite in the nozzle. Further, there are problems that noise and vibration that are generated by the fluid pump may stress the user or may interfere with sleep and bacteria may propagate therein.

Further, recently, oxygen manufacturing devices that use electrolysis have been developed and used, but they use an alkalic electrolyte solution, so there is a defect that careful attention is required to handle the alkalic electrolyte solution and there is a problem with safety There is an 'apparatus for producing oxygen using water' in Korean Patent Application No. 10-2005-0031091 that has been made in consideration of the problems described above. The apparatus is easily operated without generating noise because it produces high-purity oxygen by electrolyzing water without using an electrolyte, an additive, etc., the apparatus is safe and easily managed because it does not use an electrolyte such as alkali, and the apparatus has high efficiency while using a small amount of power and has a compact external shape.

However, oxygenated water manufacturing devices described above, oxygenated water manufacturing devices using an oxygen generator that uses water, and oxygenated water manufacturing devices using other various oxygen generator are all equipped with a separate water tank with a large volume to supply water that is the raw water for producing oxygen, so there are a lot of inconveniences, for example, it is required to continuously supply water to the water tanks, it is required to supply water by frequently supplying a larger water container, and it is required to keep checking the remaining water in order to supplement water.

Further, since a separate large-volume water tank or water container should be installed, the entire volume increases and the structure is complicated, which increases the manufacturing cost.

Further, there is a huge problem that if necessary water supply is stopped, it is impossible to use the devices.

On the other hand, in reactive oxygen species, reactive oxygen species that are harmful to a human body due to high oxidizing power are produced in large quantity when they are exposed to ultraviolet rays.

Not all the reactive oxygen species are harmful to a human body. There are superoxide, hydrogen peroxide, hydroxyl-radical, and reactive oxygen species with weak oxidizing power such as superoxide and hydrogen peroxide provide necessary actions for a human body, thereby expanding blood vessels, performing neurotransmission, producing sperm, defending against cancer, an enhancing immunity, etc.

Accordingly, if all of reactive oxygen species are removed, several problems occur in a human body, so studies about a method of selectively removing only reactive oxygen species having strong oxidizing power and being harmful to a human body have been continuously conducted, in which hydrogen water is addressed.

This is because hydrogen can selectively deoxidize hydroxyl-radicals that are reactive oxygen species having strong oxidizing power and attacking cells or genes without reacting with reactive oxygen species having weak oxidizing power and being necessary for a human body.

Further, activated carbon, other than reactive oxygen species, is unavoidably accumulated in a human body due to inspiration stress, food additives, drinking, smoking, rigorous exercises, ultraviolet rays, etc. When a large amount of activated carbon is accumulated, the inside of a human body can be oxidized because the oxidization is specifically strong, which may cause aging and diseases.

Hydrogen water can also remove such activated carbon. When hydrogen water flows into a human body, it is dissolved into hydrogen by action of carbon and atomic hydrogen bonds with excessive carbon and changes into water, whereby it is possible to discharge excessive carbon out of the human body.

A hydrogen generator that can remove reactive oxygen species and active carbon that are harmful to a human body, as described above, and a hydrogen water generator using the hydrogen generator have been developed a lot in the related art, but they also have problems similar to the oxygenated water manufacturing devices.

There is an 'oxygen-rich water and/or hydrogen-rich water maker' in Korean Patent No. 10-1742948 that has been designed to be able to produce oxygenated water and/or hydrogen water containing a large amount of high-purity oxygen and filed by the applicant(s). The oxygen-rich water and/or hydrogen-rich water maker is designed fundamentally to produce oxygenated water or hydrogen water by supplying oxygen or hydrogen, which is generated by an oxygen/hydrogen generator that generates oxygen or hydrogen by electrolyzing water, to water using a fluid pump.

According to the oxygen-rich water and/or hydrogen-rich water maker, a mineral water bottle cap having a nozzle elongated downward is coupled to the mouth of a portable mineral water bottle filled with mineral water and is then coupled and fixed to a mineral water bottle cap coupler formed at an oxygen/hydrogen water maker body, or the mineral water bottle cap is coupled to the a mineral water bottle cap coupler and then a mineral water bottle is coupled to the mineral water bottle cap.

In this state, when an oxygen/hydrogen water generation switch is turned on, the fluid pump forcibly suctions the water in the mineral water bottle through a water suction hole formed in the nozzle of the mineral water bottle cap and then injects the water back into the mineral water bottle through an oxygen/hydrogen water outlet hole formed in the nozzle using a solenoid valve, thereby circulating the water.

Further, oxygen or hydrogen is generated by continuously supplying the water suctioned by the fluid pump to an oxygen/hydrogen generator using a water level sensor and the solenoid valve, and then the oxygen or hydrogen is forcibly suctioned by the fluid pump and discharged through the oxygen/hydrogen outlet hole formed in the nozzle of the mineral water bottle cap using the solenoid valve.

Accordingly, oxygenated water or hydrogen water is produced directly in the mineral water bottle by using the mineral water in the portable mineral water bottle as raw water.

The oxygen-rich water and/or hydrogen-rich water maker has the advantage that it is possible to reduce the entire volume and simply, quickly, conveniently, and efficiently produce anytime oxygenated water or hydrogen water containing high-purity oxygen or hydrogen in a portable mineral water bottle using the mineral water in the portable mineral water bottle as raw water.

Further, the oxygen-rich water and/or hydrogen-rich water maker body is equipped with an analog or digital polarity switch that can alternately supply +/− polarities to a power supply line that supplies power to the oxygen/hydrogen generator, so it is possible to selectively produce oxygenated water or hydrogen water using a single device. Accordingly, there is the advantage that convenience in use is maximized.

Therefore, a user can produce and drink oxygenated water or hydrogen water with high-purity oxygen or hydrogen, anytime if necessary, so not only fresh oxygen is supplied to the body, but also hydrogen is supplied to the body, thereby being able to remove reactive oxygen species or active carbon, which are harmful to the body, and lead a healthy life.

However, according to Korean Patent No. 10-1742948 that is previous application by the applicant(s), the mineral water in a portable mineral water bottle is directly used as raw water.

Accordingly, there is a defect that it is possible to use mineral water or put and use purified water in a mineral water bottle, but it cannot be applied to other various drinks such as tap water, barley tea, green tea, corn silk tea, and soju.

Further, an ion resin membrane disposed between the anode and the cathode in the oxygen generator is deformed by a water-drying phenomenon in which the water in a hydrogen outlet connected to the bottom of the oxygen/hydrogen generator, so there is a possibility that the oxygen generation efficiency is deteriorated or, if severe, oxygen is never generated.

DISCLOSURE

Technical Problem

An object of the present invention provides a high-quality oxygenated water manufacturing device that produces oxygenated water by supplying oxygen, which is generated by an oxygen generator that generates oxygen by electrolyzing water, to water using a fluid pump that suctions or discharges the oxygen by further improving the invention of Korean Patent No. 10-1742948 that is a previous invention by the applicant(s).

The oxygenated water manufacturing device can be used in various fields because it can be applied to and used for not only mineral water or purified water, but also other various drinks such as tap water, barley tea, green tea, corn silk tea, and soju by using a specific configuration.

Further, the oxygenated water manufacturing device provides only high-purity oxygen by primarily filtering out ozone, which is generated with oxygen when the oxygen is generated, and inorganic substances or organic substances containing calcium (Ca), magnesium (Mg), and silicon (Si) contained in mineral water in a wet type using a wet-type ozone removal filter made of carbon, by discharging the oxygen to an oxygen outlet, and then by secondarily completely filtering out ozone in a dry type using a dry-type ozone removable filter made of carbon and connected to the oxygen outlet.

Further, the oxygenated water manufacturing device completely prevents a phenomenon in which oxygen is not generated by deformation of an ion resin membrane disposed between an anode and a cathode in an oxygen generator due to a water-drying phenomenon at a hydrogen outlet by keeping water collected in the hydrogen outlet by connecting the hydrogen outlet connected to the bottom of the oxygen generator to a sponge case having sponge therein to the upper portion of a side of the oxygen generator.

Technical Solution

In order to achieve the objects of the present invention, an aspect of the present invention provides an oxygenated water manufacturing device that fundamentally produces oxygenated water by supplying oxygen to water using a fluid pump that suctions or discharges oxygen generated from an oxygen generator that generates oxygen by electrolyzing water, in which a drink bottle cap having a long downward nozzle is coupled to a mouth of a portable drink bottle filled with various drinks (e.g., mineral water, purified water, tap water, barley tea, corn silk tea, green tea, and soju and is then coupled and fixed to a drink bottle cap coupler formed at an oxygenated water manufacturing device body, or the drink bottle cap is coupled to the drink bottle cap coupler and then a drink bottle is coupled to the drink bottle cap;

when an oxygenated water generation switch disposed on a main board is touched and turned on in this state, the fluid pump operates and forcibly suctions the drink in the portable drink bottle through a water suction hole formed in the nozzle of the drink bottle cap, the drink is sent into the fluid pump through a first connection pipe and a Y-shaped tube, and then the drink is injected back into the drink bottle through a second connection pipe and an oxygen outlet hole formed in the nozzle of the drink bottle cap, whereby the drink is continuously circulated;

when the drink is circulated, the oxygen generator that is supplied with mineral water from a mineral water bottle for oxygen generation separately mounted on a side of the oxygenated water manufacturing device body continuously generates oxygen, and the oxygen is filtered through a filter and then sent to the fluid pump; and high-purity oxygen, which is sent through the oxygen generator→the wet-type ozone removal filter→the dry-type ozone removal filter→the fluid pump by the operation of the oxygen generator that is supplied with mineral water from the separate mineral water bottle, is continuously supplied to the drink repeatedly circulating through the drink bottle-→the fluid pump→the drink bottle by the operation of the fluid pump, so the drink mixed with the oxygen is discharged through the second connection pipe and the oxygen outlet hole formed in the nozzle of the drink bottle cap, whereby oxygenated water with high-purify oxygen dissolved therein is produced in the portable drink bottle.

Advantageous Effects

The oxygenated water manufacturing device of the present invention fundamentally can be manufactured with a compact volume.

According to the present invention, a drink in the portable drink bottle is repeatedly circulated through the drink bottle the fluid pump the drink bottle by operation of the fluid pump in the oxygenated water manufacturing device body, and simultaneously, high-purity oxygen (from which ozone, which is produced with oxygen when the oxygen is generated, and various inorganic substances and organic substances such as calcium (Ca), magnesium (Mg), and silicon (Si) contained in mineral water are primarily filtered out in a wet type through a wet-type ozone removal filter made of carbon, the oxygen is discharged to the oxygen outlet, and then ozone is secondarily completely filtered out in a dry type through a dry-type ozone removal filter made of carbon and connected to the oxygen outlet), is continuously supplied, whereby oxygenated water with high-purity oxygen dissolved therein is produced in the portable drink bottle. Therefore, the prevent invention can be used in various fields because it can it is possible to put not only mineral water and purified water, but also other various drinks such as tap water, barley tea, green tea, corn silk tea, and soju in a portable drink bottle or to use a container as it is.

Further, a phenomenon in which oxygen is not generated by deformation of an ion resin membrane disposed between an anode and a cathode in an oxygen generator due to a water-drying phenomenon at a hydrogen outlet is prevented by keeping water collected in the hydrogen outlet by connecting the hydrogen outlet connected to the bottom of the oxygen generator to a sponge case having sponge therein to the upper portion of a side of the oxygen generator. Accordingly, high-purity oxygen is stably generated.

Further, since the oxygenated water manufacturing device body is equipped with an analog or digital polarity switch that can alternately supply +/− polarities to a power supply line that supplies power to the oxygen/hydrogen generator, it is possible to selectively produce oxygenated water or hydrogen water using a single device. Accordingly, there is the advantage that convenience in use is maximized.

Therefore, the present invention can be considered as a very epoch-making invention in terms that a user can anytime produce drinkable water with high-purity oxygen or hydrogen in a portable bottle filled with not only a drink that the user has selected, that is, mineral water or purified water, but also other various drinks such as tap water, barley tea, green tea, corn silk tea, and soju, and can drink the drinkable water, so the user can supply not only fresh oxygen, but also hydrogen to the body while drinking desired drinks, thereby being able to remove reactive oxygen species or active carbon, which are harmful to the body, and lead a healthy life.

DESCRIPTION OF DRAWINGS

FIGS. 1 to 9 are views showing an embodiment of an oxygenated water manufacturing device of the present invention, in which FIG. 1 is a front perspective view showing an assembled state;

FIG. 2 is a rear perspective view showing the assembled state;

FIG. 3 is a partial exploded top perspective view;

FIG. 4 is a partial exploded bottom perspective view;

FIG. 5 is a rear perspective view showing the interior main structure of an oxygenated water manufacturing device body from the right side;

FIG. 6 is a rear perspective view showing the interior main structure of the oxygenated water manufacturing device body from the left side;

FIG. 7 is a bottom perspective view showing the interior main structure of the oxygenated water manufacturing device body;

FIG. 8 is a right side view showing the interior main structure of an oxygenated water manufacturing device; and FIG. 9 is a partial enlarged view.

BEST MODE

Figure 1:
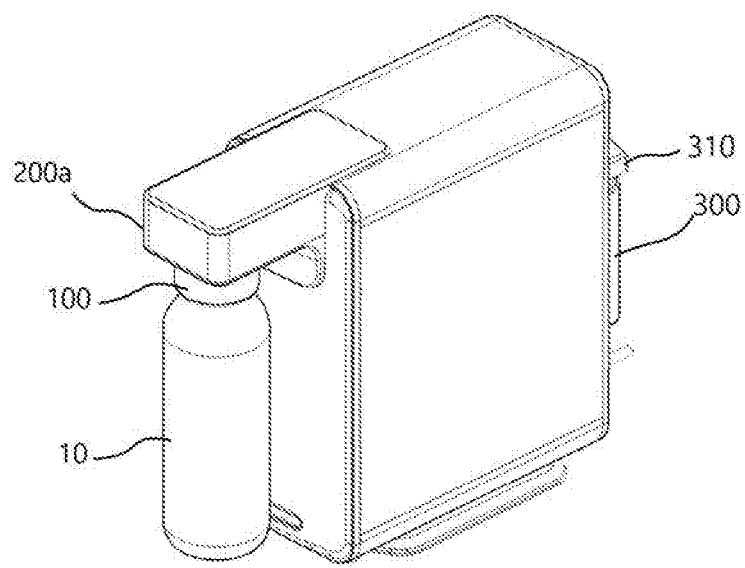
Figure 2:
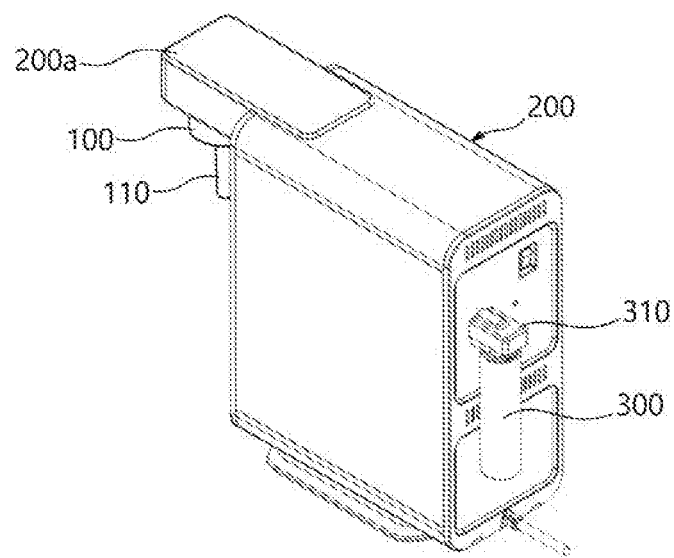
Figure 3:
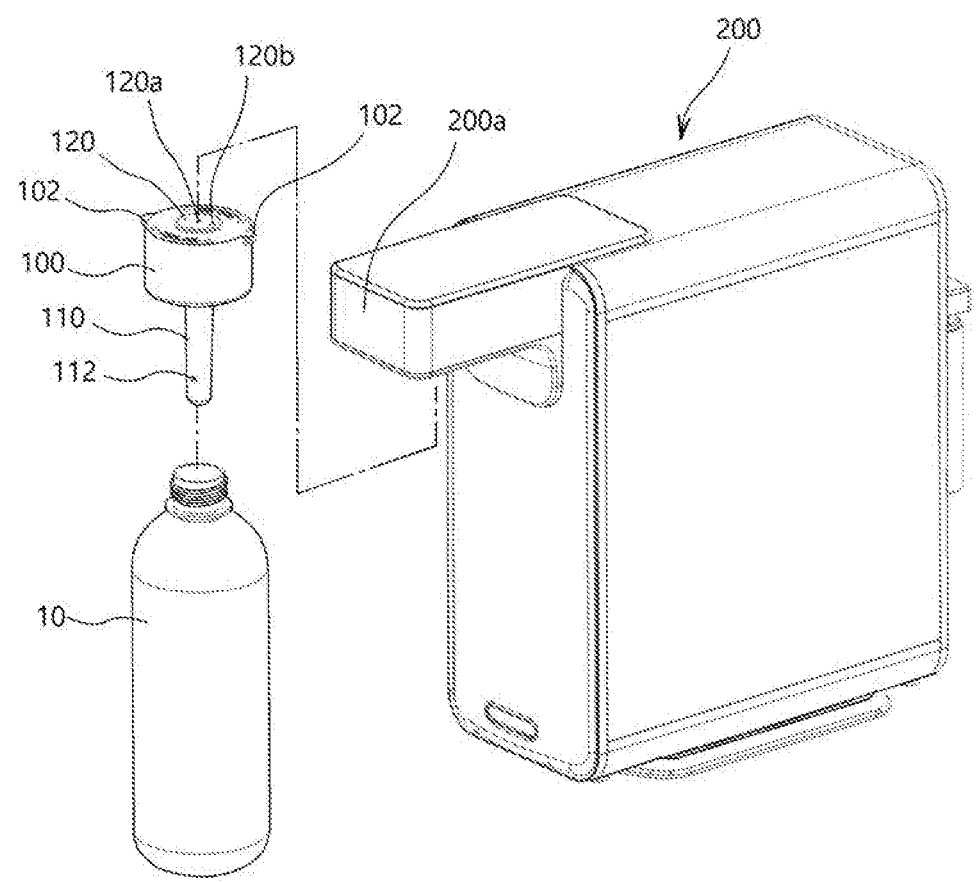
Figure 4:
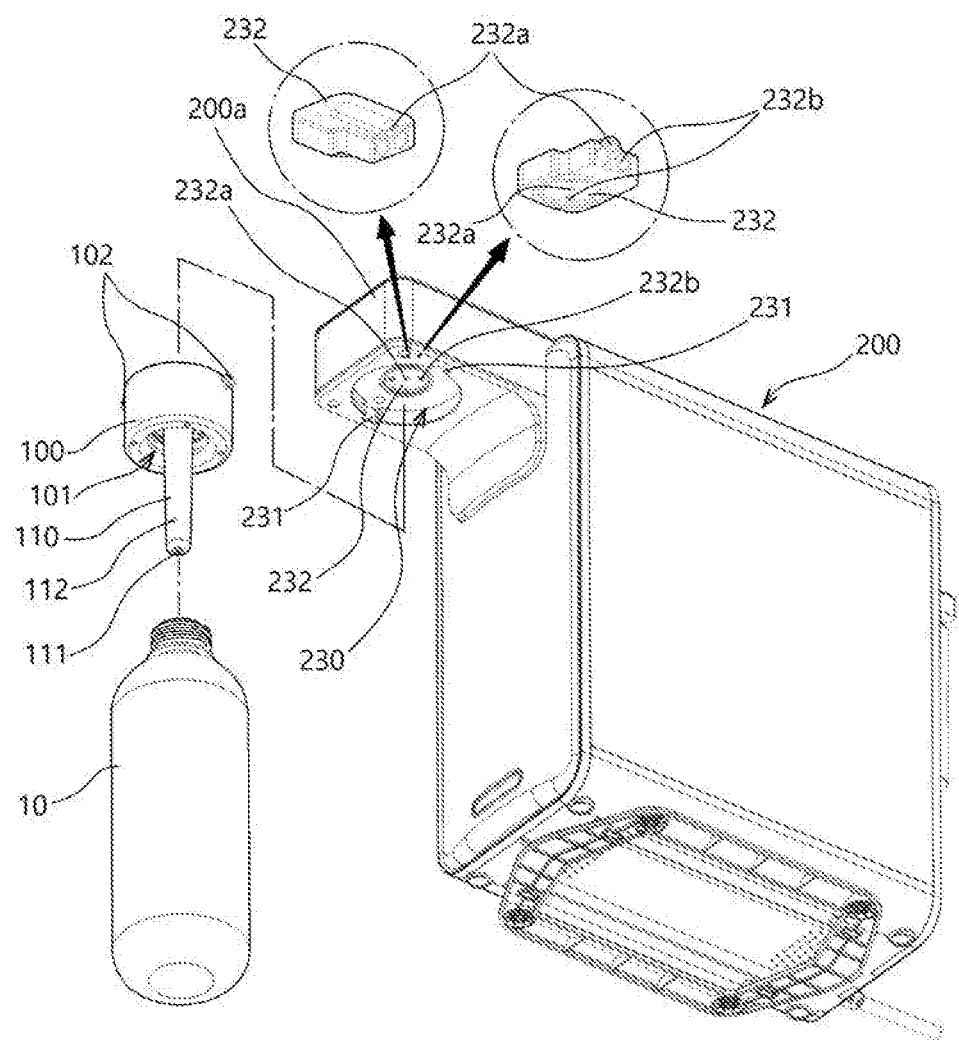
Figure 5:
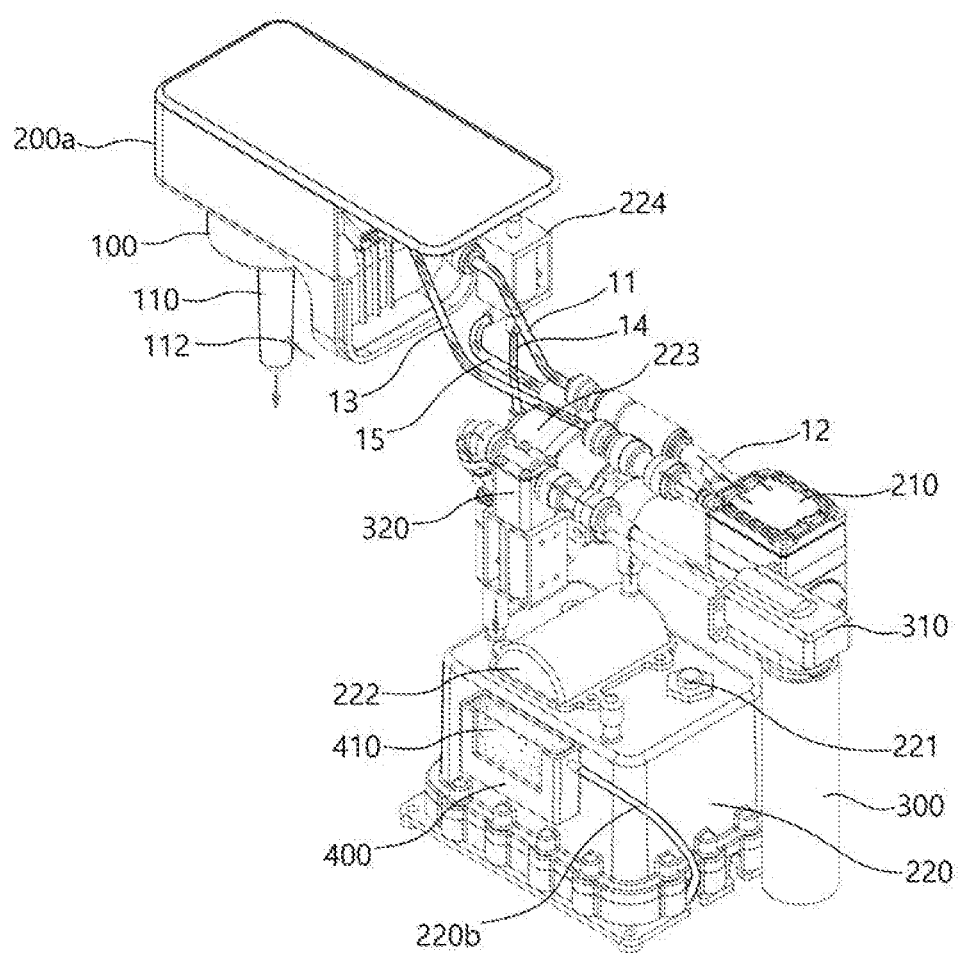
Figure 6:
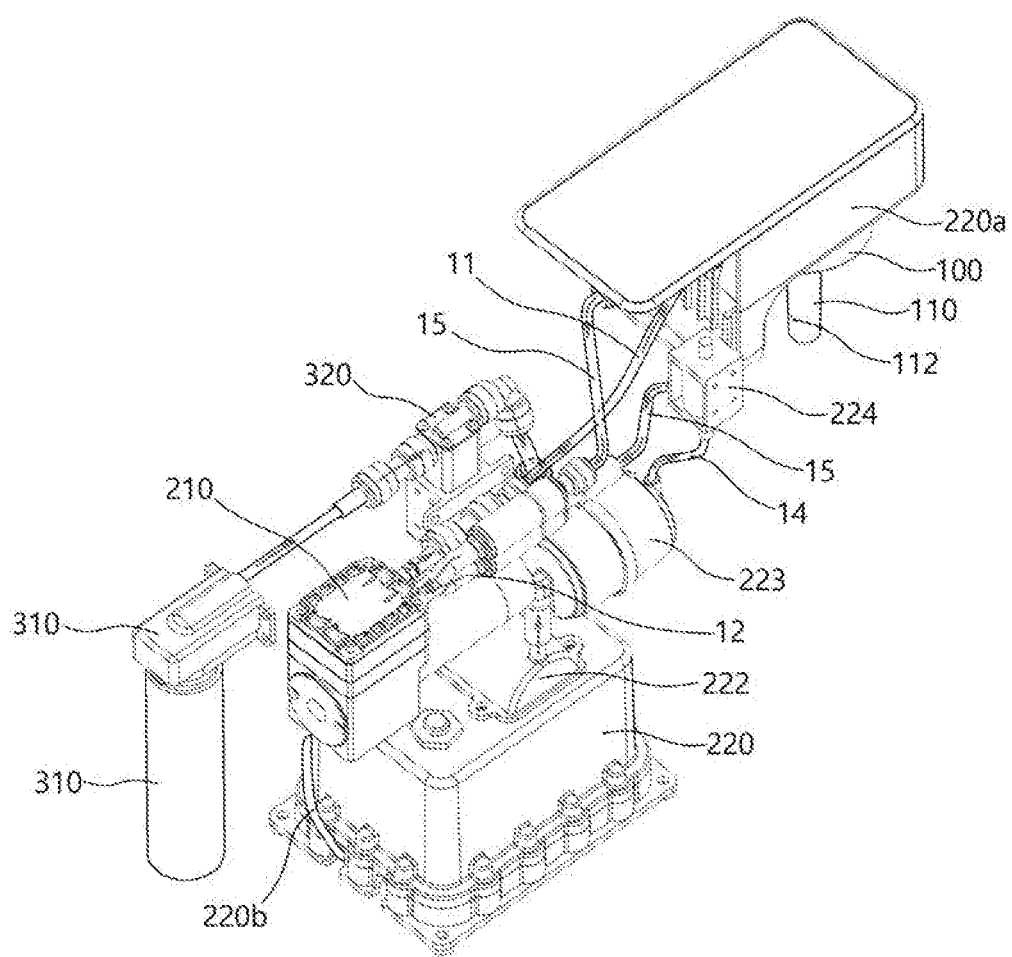
Figure 7:
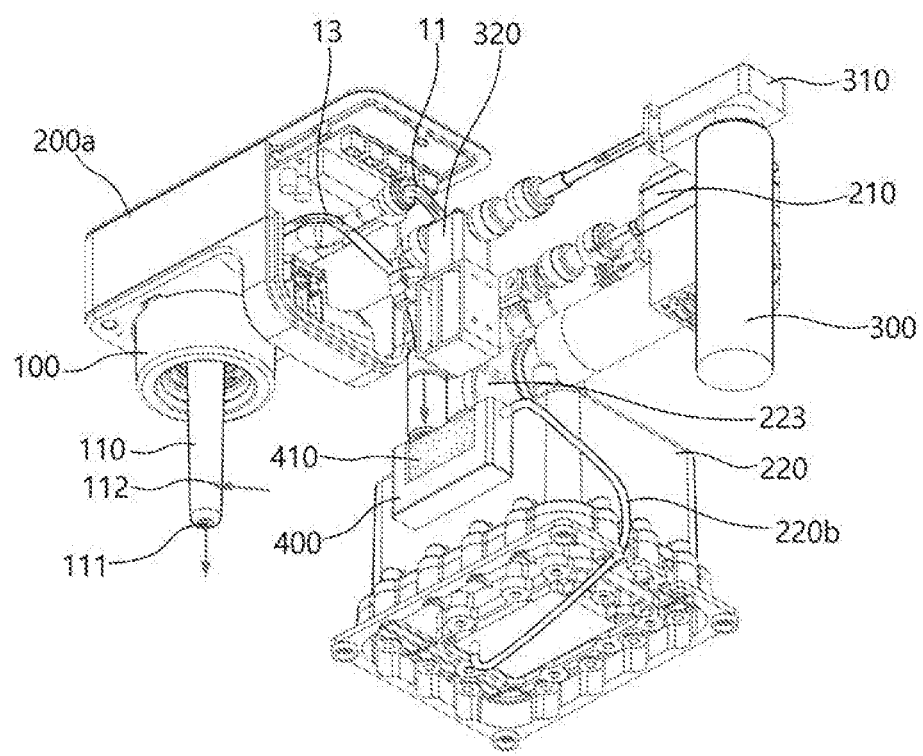
Figure 8:
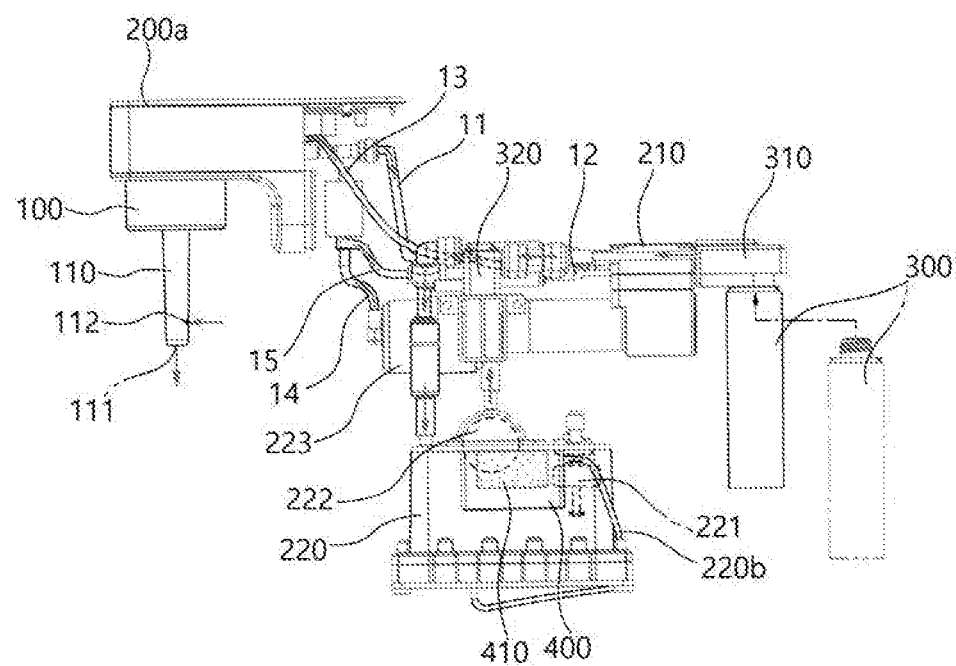
Figure 9:
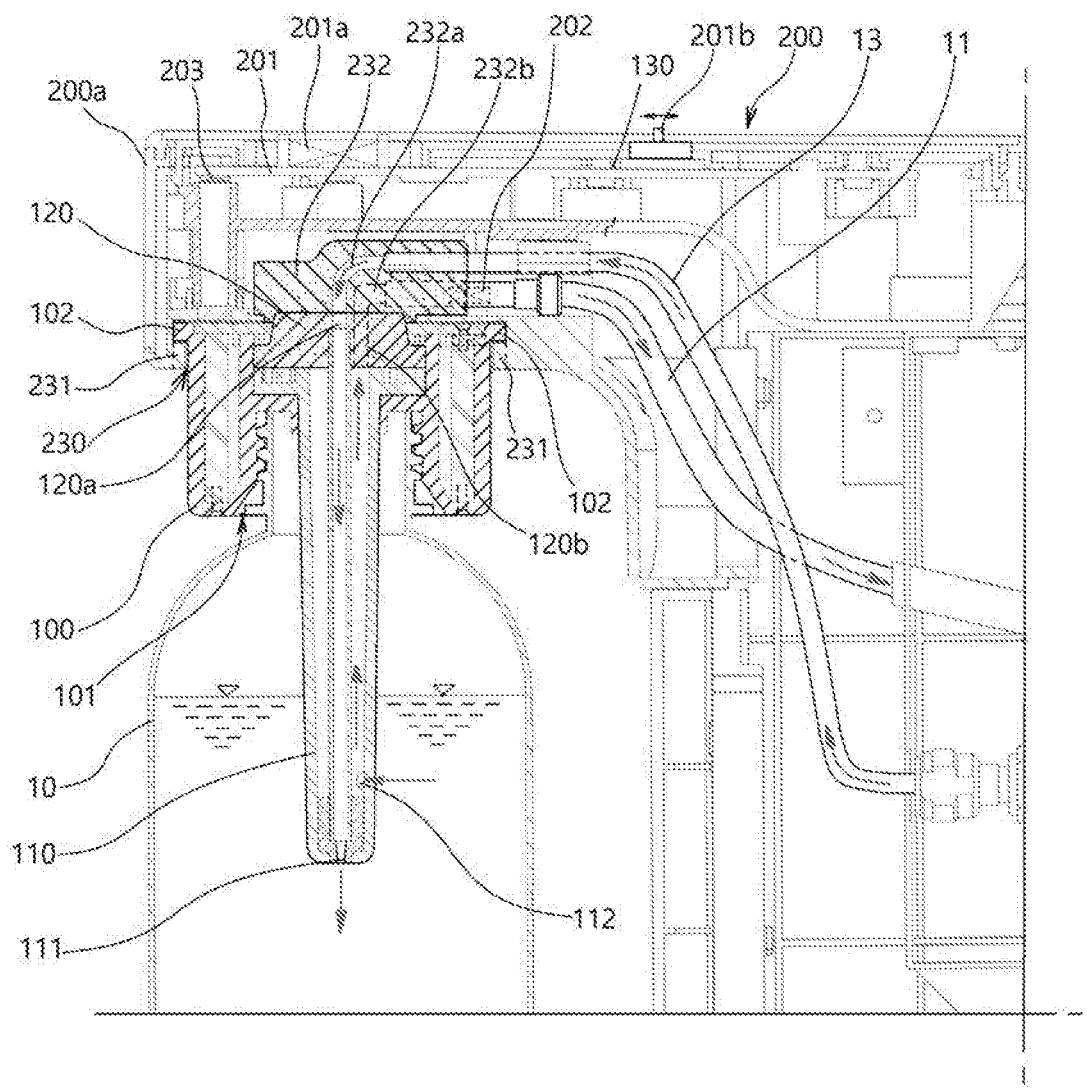

Hereafter, embodiments of the present invention are described in detail with reference to the FIGS. 1 to 9. The following embodiments are only example for helping understand the present invention and it should be understood that the present invention may be modified in various ways different from the embodiments described herein. Further, in describing the present invention, detailed descriptions and drawings of well-known functions or components relating to the present invention will not be provided so as not to obscure the description of the present invention with unnecessary details. Further, the dimensions of some components are not shown with the actual scales and may be exaggerated in the drawings to help understand the present invention.

An oxygenated water manufacturing device using an oxygen generator of the present invention produces oxygenated water by suctioning oxygen, which is generated by an oxygen generator 220 that generates oxygen by electrolyzing water, using a fluid pump 210 and then supplying the oxygen to water.

A drink bottle cap 100 having a nozzle 110 elongated downward is coupled to the mouth of a portable drink bottle filled with a drink (e.g., mineral water, purified water, tap water, barley tea, corn silk tea, green tea, and soju and is then coupled and fixed to a drink bottle cap coupler 230 formed at an oxygenated water manufacturing device body 200, or the drink bottle cap 100 is coupled to the drink bottle cap coupler 230 and then a drink bottle 10 is coupled to the drink bottle cap 100.

In this state, when an oxygenated water generation switch 201a is touched and turned on, the fluid pump 210 operates and forcibly suctions the drink in the portable drink bottle 10 through a water suction hole 112 formed in the nozzle 110 of the drink bottle cap 100, the drink is sent into the fluid pump 210 through a first connection pipe 11 and a Y-shaped tube 12, and then the drink is injected back into the drink bottle 10 through a second connection pipe 13 and an oxygen outlet hole 111 formed in the nozzle 110 of the drink bottle cap 100, whereby the drink is continuously circulated.

Further, when the drink is circulated, the oxygen generator 220 that is supplied with mineral water from a mineral water bottle 300 for oxygen generation separately mounted on a side of the oxygenated water manufacturing device body 200 continuously generates oxygen, and the oxygen is filtered through a filter and then sent to the fluid pump 210.

Further, high-purity oxygen, which is sent through the oxygen generator 220→the filter→the fluid pump 210 by the operation of the oxygen generator 220 that is supplied with mineral water from the separate mineral water bottle 300, is continuously supplied to the drink repeatedly circulating through the drink bottle 10→the fluid pump 210→the drink bottle 10 by the operation of the fluid pump 210, so the drink mixed with the oxygen is discharged through the second connection pipe 13 and the oxygen outlet hole 111 formed in the nozzle 110 of the drink bottle cap 100, whereby oxygenated water with high-purify oxygen dissolved therein is produced in the portable drink bottle 10.

In this configuration, the oxygen generator 220 is supplied with mineral water from the mineral water bottle 300 for oxygen generation or purified water filled in the mineral water bottle 300 detachably mounted on a side of the oxygenated water manufacturing device body 200.

The mineral water or purified water in the mineral water bottle 300 can be supplied by selective control of a solenoid valve 320 in response to a water level sensing signal from a water level sensor 221 disposed in the oxygen generator 220.

The mineral water bottle 300 separately mounted is manufactured to be transparent so that whether there is remaining mineral water can be visually checked.

Further, the filter that filters the oxygen generated by the oxygen generator 220 may include:

a wet-type ozone removable filter 222 that is made of carbon, is integrally mounted on the top of the oxygen generator 220, primarily filters out, in a wet type, ozone, which is produced with oxygen when mineral water is electrolyzed, and various inorganic substances and organic substances such as calcium (Ca), magnesium (Mg), and silicon (Si) contained in the mineral water, and then discharges the oxygen through an oxygen outlet 220a; and a dry-type ozone removal filter 223 that is made of carbon, is connected to the oxygen outlet 220a, and secondarily completely filters out ozone so that high-purity oxygen is produced.

Further, a hydrogen outlet 220b connected to the bottom of the oxygen generator 220 is connected to a sponge case 400 having sponge 410 therein and disposed at the upper portion of a side of the oxygen generator 220 so that water always collects in the hydrogen outlet 220b.

Accordingly, it is possible to completely prevent a phenomenon in which oxygen is not generated by deformation of an ion resin membrane disposed between an anode (+) and a cathode (−) in the oxygen generator 220 due to a water-drying phenomenon at the hydrogen outlet 220b.

Further, according to the present invention, a common analog or digital polarity switch that can supply power to the oxygen generator 220 in the oxygenated water manufacturing device body 200 and can switch +/− polarities is connected to the oxygen generator 220.

Further, an ozone removable filter made of carbon is further disposed at the hydrogen outlet 220b of the oxygen generator 220.

Accordingly, it is possible to selectively produce not only oxygenated water, but also hydrogen water using a single device.

The operation state of the oxygenated water manufacturing device of the present invention is described hereafter.

In order to produce oxygenated water using the oxygenated water manufacturing device of the present invention, first, the mineral water bottle 300 for oxygen generation fully filled with mineral water or purified water is mounted on a mineral water bottle-fixing bracket 310 formed on a side of the oxygenated water manufacturing device body 200 in order to be able to supply mineral water or purified water for oxygen generation to the oxygen generator 220.

Next, the drink bottle cap 100 is fastened and fixed by thread-fastening the drink water bottle mouth coupler 101 formed at the drink bottle cap 100 to the mouth of the portable drink bottle 10 filled with various drinks (e.g., mineral water, purified water, tap water, barley tea, corn silk tea, green tea, and soju).

Accordingly, the lower portion of the nozzle 110 elongated downward from the drink bottle cap 100 sinks in the drink, and the oxygen outlet hole 111 and the water suction hole 112 formed at the lower portion of the nozzle 110 also sink in the drink.

In this state, the drink bottle cap 100 coupled to the portable drink bottle 10 needs to be fastened and fixed to a drink bottle cap coupler 230 formed on the bottom of a protrusive head 200a of the oxygenated water manufacturing device body 200. To this end, as an embodiment of the present invention, a fastening protrusion 102 of the drink bottle cap 100 is inserted and rotated in a cap fastening groove 231 of the drink bottle cap coupler 230, whereby the drink bottle cap 100 is coupled to the drink bottle cap coupler 230.

Further, a nozzle cap 120 made of silicon and having an oxygen supply channel 120a and a water discharge channel 120b is disposed at the center of the top of the drink bottle cap 100.

Further, a nozzle cap retainer 232 made of silicon and having an oxygen supply channel 232a and a water discharge channel 232b is disposed on the top of the inlet of the drink bottle cap coupler 230, so the top of the nozzle cap 120 is brought in close contact with the bottom of the nozzle cap retainer 232, and the oxygen supply channel 120a and the water discharge channel 120b formed in the nozzle cap 120 are naturally respectively connected to the oxygen supply channel 121a and the water discharge channel 232b formed in the nozzle cap retainer 232, whereby drink and oxygen can move.

Meanwhile, according to the present invention, the drink bottle cap 100 is coupled to the drink bottle cap coupler 230 and then the drink bottle 10 can be coupled to the drink bottle cap 100.

After the portable drink bottle 10 is connected to the oxygenated water manufacturing device body 200 in this way described above, when a user touches and turns on the oxygenated water generation switch 201a disposed on the main board 201, the device operates for several set minutes and oxygenated water is produced in the portable drink bottle 10.

That is, the fluid pump 210 operates and forcibly suctions the drink in the portable drink bottle 10 through the water suction hole 112 formed in the nozzle 110 of the drink bottle cap 100, the drink is sent into oxygenated water manufacturing device body 200, in detail, into the fluid pump 210 through the first connection pipe 11 and the Y-shaped tube 12, and then the drink is injected back into the drink bottle 10 through the second connection pipe 13 and an oxygen outlet hole 111 formed in the nozzle 110 of the drink bottle cap 100, whereby the drink is continuously circulated.

Further, when the drink is circulated by the operation of the fluid pump 210, the oxygen generator 220 operates and generates oxygen by electrolyzing water, the generated oxygen passes through the wet-type ozone removal filter 222 made of carbon and integrally mounted on the oxygen generator 220 by operation of an air solenoid valve 224, and in this process, ozone generated with the oxygen when mineral water is electrolyzed and various inorganic substances and organic substances such as calcium (Ca), magnesium (Mg), and silicon (Si) contained in the mineral water are primarily filtered out in a wet type, and then specifically ozone is secondarily completely filtered out in a dry type while the oxygen passes through the dry-type ozone removal filter 223 through the oxygen outlet 220a, whereby high-purity oxygen is continuously produced.

Further, the high-purity oxygen produced in this way moves to the air solenoid valve 224 through a third connection pipe 14, and is then sent to the Y-shaped tube 12 through a fourth connection pipe 15 and then sent to the fluid pump 210 through the Y-shaped tube 12.

Accordingly, high-purity oxygen, which is sent through the oxygen generator 220 the wet-type ozone removal filter 222→the dry-type ozone removal filter 223→the fluid pump 210 by the operation of the oxygen generator 220 that is supplied with mineral water directly from the separate mineral water bottle 300, is continuously supplied to the drink repeatedly circulating through the drink bottle 10→the fluid pump 210→the drink bottle 10 by the operation of the fluid pump 210, so the drink mixed with the oxygen is discharged through the second connection pipe 13 and the oxygen outlet hole 111 formed in the nozzle 110 of the drink bottle cap 100.

Accordingly, oxygen is continuously supplied into the drink bottle 10 and dissolved in the drink, so oxygenated water is very simply and directly produced in the portable drink bottle 10.

Therefore, by using the oxygenated water manufacturing device of the present invention, high-purity oxygen is supplied conveniently anytime to various drink in the portable drink bottle 10, so, depending on the kinds of drinks in the drink bottle 10, for example, oxygenated water is simply, quickly, and completely produced when the drink is mineral water, purified water, tap water, or barley tea, and oxygenated soju containing a large amount of oxygen is also simply, quickly, and completely produced when the drink is soju.

Further, since the oxygenated water manufacturing device body is equipped with an analog or digital polarity switch that can alternately supply +/− polarities to a power supply line that supplies power to the oxygen/hydrogen generator, it is possible to selectively produce oxygenated water or hydrogen water using a single device.

Therefore, according to the present invention, a user can anytime produce drinkable water with high-purity oxygen or hydrogen in a portable bottle filled with not only a drink that the user has selected, that is, mineral water or purified water, but also other various drinks such as tap water, barley tea, green tea, corn silk tea, and soju, and can drink the drinkable water, so the user can supply not only fresh oxygen, but also hydrogen to the body while drinking desired drinks, thereby being able to remove reactive oxygen species or active carbon, which are harmful to the body, and lead a healthy life.

Although the present disclosure was described with reference to limited exemplary embodiments and drawings, the present disclosure is not limited thereto and may be changed and modified in various ways within the spirit of the present disclosure and claims described below by those skilled in the art.

INDUSTRIAL APPLICABILITY

Since the oxygenated water manufacturing device can be applied to and used for not only mineral water or purified water, but also other various drinks such as tap water, barley tea, green tea, corn silk tea, and soju, it can be used in various fields.

Further, it is possible to use only high-purity oxygen from which ozone, which is produced with oxygen when mineral water is electrolyzed, and various inorganic substances and organic substances such as calcium (Ca), magnesium (Mg), and silicon (Si) contained in the mineral water are completely filtered out.

Meanwhile, it is possible to completely prevent the phenomenon in which oxygen generation efficiency is deteriorated or oxygen is never generated due to deformation of the ion resin membrane disposed between the anode and the cathode in the oxygen generator by a water-drying phenomenon in the hydrogen outlet connected to the bottom of the oxygen generator.

The present invention is expected to be able to be used not only in the haircut and beauty field that removes reactive oxygen species, but also various drink fields because it can be freely used for various materials such as not only mineral water and purified water, but also other various drinks including tap water, barley tea, green tea, corn silk tea, and soju.

The invention claimed is:

1. An oxygenated water manufacturing device that produces oxygenated water by supplying oxygen to water using a fluid pump that suctions or discharges oxygen generated from an oxygen generator that generates oxygen by electrolyzing water,
   wherein a drink bottle cap having a nozzle elongated downward is coupled to a mouth of a portable drink bottle filled with a drink and is then coupled and fixed to a drink bottle cap coupler formed at an oxygenated water manufacturing device body, or the drink bottle cap is coupled to the drink bottle cap coupler and then a drink bottle is coupled to the drink bottle cap;
   when an oxygenated water generation switch disposed on a main board is touched and turned on in this state, the fluid pump in the oxygenated water manufacturing device body operates and forcibly suctions the drink in the portable drink bottle through a water suction hole formed in the nozzle of the drink bottle cap, the drink is sent into the fluid pump through a first connection pipe and a Y-shaped tube, and then the drink is injected back into the drink bottle through a second connection pipe and an oxygen outlet hole formed in the nozzle of the drink bottle cap, whereby the drink is continuously circulated;
   when the drink is circulated, the oxygen generator that is supplied with mineral water or purified water from a mineral water bottle for oxygen generation separately mounted on a side of the oxygenated water manufacturing device body continuously generates oxygen, and the oxygen is filtered through a filter and then sent to the fluid pump; and
   high-purity oxygen, which is sent through the oxygen generator, the filter, and the fluid pump by the operation of the oxygen generator that is supplied with mineral water from the separate mineral water bottle, is continuously supplied to the drink repeatedly circulating through the drink bottle, the fluid pump, and the drink bottle by the operation of the fluid pump, so the drink mixed with the oxygen is discharged through the second connection pipe and the oxygen outlet hole formed in the nozzle of the drink bottle cap, whereby oxygenated water with high-purify oxygen dissolved therein is produced in the portable drink bottle.

2. The oxygenated water manufacturing device of claim 1, wherein the oxygen generator is supplied with mineral water from the mineral water bottle for oxygen generation separately detachably mounted on a side of the oxygenated water manufacturing device body, and
   the mineral water in the mineral water bottle is supplied by selective control of a solenoid valve in response to a water level sensing signal from a water level sensor disposed in the oxygen generator.

3. The oxygenated water manufacturing device of claim 1, wherein the mineral water bottle separately mounted is manufactured to be transparent so that whether there is remaining mineral water can be visually checked.

4. The oxygenated water manufacturing device of claim 1, wherein the filter that filters the oxygen generated from the oxygen generator includes:
   a wet-type ozone removable filter that is made of carbon, is integrally mounted on a top of the oxygen generator, primarily filters out, in a wet type, ozone, which is produced with oxygen when mineral water is electrolyzed, and various inorganic substances and organic substances such as calcium (Ca), magnesium (Mg), and silicon (Si) contained in the mineral water, and then discharges the oxygen through an oxygen outlet; and
   a dry-type ozone removal filter that is made of carbon, is connected to the oxygen outlet, and secondarily completely filters out ozone so that high-purity oxygen is produced.

5. The oxygenated water manufacturing device of claim 1, wherein a hydrogen outlet connected to a bottom of the oxygen generator is connected to a sponge case having sponge therein and disposed at an upper portion of a side of the oxygen generator so that water always collects in the hydrogen outlet,
   thereby completely preventing a phenomenon in which oxygen is not generated by deformation of an ion resin membrane disposed between an anode (+) and a cathode (−) in the oxygen generator due to a water-drying phenomenon in the hydrogen outlet.

\* \* \* \* \*